United States Patent [19]

Bergner

[11] Patent Number: 4,984,945
[45] Date of Patent: Jan. 15, 1991

[54] EXPANSION DOWEL ASSEMBLY

[75] Inventor: Arndt Bergner, Munich, Fed. Rep. of Germany

[73] Assignee: Hilti Aktiengesellschaft

[21] Appl. No.: 247,957

[22] Filed: Sep. 22, 1988

[30] Foreign Application Priority Data

Sep. 22, 1987 [DE] Fed. Rep. of Germany ....... 3731818

[51] Int. Cl.⁵ .................. F16B 13/04; F16B 13/06
[52] U.S. Cl. .................................. 411/30; 411/55; 411/60
[58] Field of Search .............. 411/44, 54, 55, 57, 411/60, 69, 70, 71, 72, 30, 31

[56] References Cited

U.S. PATENT DOCUMENTS

| 688,756 | 12/1901 | Tripp | 411/57 X |
| 2,470,924 | 5/1949 | Flogaus | 411/57 |
| 4,560,311 | 12/1985 | Herb | 411/44 |
| 4,640,654 | 2/1987 | Fischer et al. | 411/57 X |

FOREIGN PATENT DOCUMENTS

| 1297330 | 5/1962 | France | 411/55 |
| 1469966 | 1/1967 | France | 411/55 |
| 2828497 | 1/1980 | France | 411/55 |
| 3134876 | 3/1983 | France | 411/57 |
| 3315451 | 10/1984 | France | 411/57 |
| 6508503 | 1/1967 | Netherlands | 411/55 |
| 2109886 | 6/1983 | United Kingdom . | |

Primary Examiner—Neill R. Wilson
Attorney, Agent, or Firm—Toren, McGeady & Associates

[57] ABSTRACT

An expansion dowel assembly is made up of an anchor bolt and an expansion sleeve laterally enclosing the bolt. The sleeve is expanded by driving it in the axial direction relative to the bolt so that the end of the sleeve widens as it moves axially over a conically shaped expanding member on the bolt. The axially extending surface of the expanding member is formed as a concave surface affording an increasing conicity in the driving direction. Cutting teeth are formed on the outer surface of the sleeve and provide a saw-tooth section. When the sleeve is driven relative to the bolt, the teeth cut into the surface of a borehole in a receiving material and form an undercut in the borehole surface. To facilitate expansion, an annular groove is located in the outside surface of the sleeve adjacent the cutting teeth. The annular groove is located on the opposite side of the cutting teeth from the leading end of the expansion sleeve.

5 Claims, 1 Drawing Sheet

EXPANSION DOWEL ASSEMBLY

BACKGROUND OF THE INVENTION

The present invention is directed to an expansion dowel assembly including an anchor bolt having an expanding member located at the leading end of a cylindrical shank with the shank having means adjacent the opposite end for connecting a load to the dowel assembly. An expansion sleeve laterally encloses the anchor bolt and is axially displaceable relative to it. Slots are formed in the expansion sleeve extending from its leading end toward the trailing end. The inside diameter of the expansion sleeve corresponds to the outside diameter of the shank, and the sleeve has a circumferentially extending cutting tooth at its leading end.

Expansion dowel assemblies of the above type, as disclosed in British Pat. No. 2 109 886 B, are anchored by driving the expansion sleeve over the expanding member on the anchor bolt with the expanding member supported at the base of a borehole. The expansion sleeve expands radially as it moves relative to the expanding member. The cutting tooth located at the front end of the expansion sleeve provides an undercut in the surface of the borehole. When a pulling force is applied to the anchor bolt, an after-expansion of the expansion sleeve is effected. Due to the relatively flat cone angle of the expanding member on the anchor bolt, very high expansion forces are developed in the expansion dowel assembly. Such expansion forces can exert an explosive effect on the receiving material in which the borehole is formed. Therefore, the known expansion dowel assembly is suitable for use in a cracked receiving material only under certain conditions. Furthermore, the energy required to drive the expansion sleeve is relatively high, because of the single cutting tooth.

SUMMARY OF THE INVENTION

Therefore, the primary object of the present invention is to provide an expansion dowel assembly which can be anchored with a low expenditure of energy and which has an after-expansion characteristic suitable for an anchorage in a cracked zone of a receiving material.

In accordance with the present invention, the surface of the expanding member extending in the axial direction has a concave configuration. Further, additional cutting teeth are arranged on the outer surface of the expansion sleeve adjacent to and on the opposite side of the circumferentially extending cutting tooth from the leading end of the sleeve. The cutting teeth form an outwardly facing substantially sawtooth-shaped section.

The concave configuration of the expanding member provides conicity which increases in the direction in which the dowel assembly is anchored. Initially, resistance is small when the expansion sleeve is first driven relative to the expanding member and increases as the driving action continues. With the after-expansion characteristic of the dowel assembly, a point is finally reached following the after-expansion where relative movement ceases due to the increasing conicity provided by the concave configuration of the expanding member surface.

As a result of the plurality of cutting teeth, the material in the borehole surface is removed and distributed between the individual cutting teeth based on the principle of a broaching tool. Overloading of the cutting teeth is prevented by such distribution. Preferably, the sawtooth-shaped section of the cutting teeth is formed in such a way that the steeper flank of the teeth faces in the direction in which the dowel assembly is inserted into a borehole and a less steep flank faces in the opposite direction.

It is advisable to provide three cutting teeth for an effective distribution of the forces developed during the removal of the material in the borehole surface. Preferably, the three cutting teeth are arranged at approximately equal axially extending distances from one another, whereby each cutting tooth removes approximately the same amount of the material as the dowel assembly is expanded.

When the dowel assembly is being anchored in a borehole, the cutting teeth are driven at different depths into the material containing the borehole. As a result, the material removed by the cutting teeth fills the spaces between adjacent cutting teeth. Advantageously, the radially measured depth in the necked-down or recessed portion between the cutting teeth decreases opposite to the direction in which the dowel assembly is inserted into the borehole. Accordingly, the intermediate spaces or grooves formed by the necked-down portions are smaller opposite to the insertion direction of the dowel assembly. Therefore, it is assured that the intermediate spaces are filled by the material removed by the cutting teeth and an additional wedging action, which increases the pull-out value of the assembly, occurs in the region of the intermediate spaces.

The concave configuration is a curve formed by a radius. Such a concavely curved configuration formed by a radius is simple to produce and results in a favorable abutment cam for the expansion sleeve.

Advantageously, the radius of the concave surface corresponds approximately to the largest diameter of the anchor bolt. Such a surface formed by a radius in the expanding region affords an effective spreading of the expansion sleeve when the dowel assembly is being secured in a borehole and also provides a favorable after-expansion behavior. Moreover, a radius corresponding approximately to the largest diameter of the anchor bolt prevents the occurrence of a notch effect.

When the dowel assembly is being anchored, the relatively sharp deformation of the expansion sleeve takes place in the expansion region. To facilitate such deformation, it is advantageous that the expansion sleeve has a cross-sectional reduction on the trailing end side of and adjacent to the cutting teeth. The axially extending sections or tabs formed by the axial extending slots in the expansion sleeve can be bent outwardly when contacting the concavely shaped expanding member without any great expenditure of force due to the cross-sectional reduction. Since the cross-sectional reduction is acted upon only by pressure during the loading of the expansion dowel, the reduction has no negative influence on the anchoring value of the assembly.

Advantageously, the cross-sectional reduction is formed by a circumferentially extending annular groove located in the outside surface of the expansion sleeve. Such an annular groove located in the outside surface of the expansion sleeve is relatively simple to produce. Due to the outward bending of the section of the expansion sleeve formed between the slots, the annular groove is at least partially closed and the groove does not result in a reduction of the contact surface of the sleeve with the surface of the borehole.

In another preferred arrangement, the cross-sectional reduction is formed by a circumferentially extending annular groove located in the inside surface of the expansion sleeve. An annular groove in the inside of the expansion sleeve does not produce a reduction of the contact surface of the expansion sleeve at the surface of the borehole.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
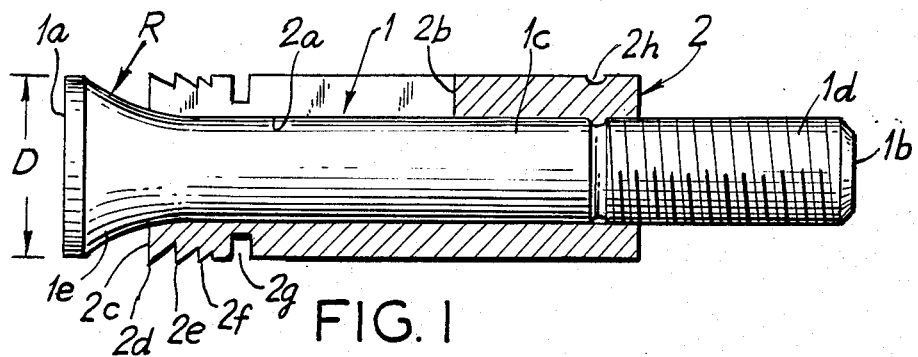
FIG. 1 is an axially extending view, partly in section, of an expansion dowel assembly embodying the present invention and illustrated in the unexpanded state.

In FIGS. 1 to 4, an expansion dowel assembly is shown made up of an axially elongated anchor bolt 1 and an axially elongated expansion sleeve 2, which laterally encloses at least an axially extending part of the anchor bolt. Further, the expansion sleeve 2 is axially displaceable relative to the anchor bolt for expanding the sleeve. Anchor bolt 1 has a leading end 1a, the left-end as viewed in FIG. 1 and a trailing end 1b, the right-end in FIG. 1. An intermediate axially extending part of the anchor bolt 1 is provided by a cylindrically shaped shank 1c. At the trailing end region of the shank 1c, an axially extending thread 1d, is formed for securing a load to the anchor bolt. At its leading end 1a, the bolt has an expanding member 1e, extending axially from the leading end of the shank 1c. The axially extending surface of the expanding member 1c, is formed as a concave curve. The radius R of the concavely curved surface is approximately equal to the largest diameter D of the anchor bolt 1, note the leading end 1a of the bolt. Due to its concavely curved surface, the expansion member 1e has a conicity increasing toward the leading end 1a.

Expansion sleeve 2 has a bore 2a extending through it with an inside diameter corresponding approximately to the outside diameter of the shank 1c so that the sleeve can be displaced axially relative to the bolt. Expansion sleeve 2 has axially extending slots 2b extending from its leading end 2c toward its trailing end. 2b facilitate the radial expansion of the sleeve. At its leading end 2c, the expansion sleeve 2 has a circumferentially extending cutting tooth 2d on its outer surface. Two additional cutting teeth 2e, 2f are arranged on the outer surface of the expansion sleeve adjacent the cutting tooth 2d and extending toward the trailing end of the sleeve. Cutting teeth 2d, 2e, 2f form a substantially sawtooth-shaped section which faces outwardly. Each tooth has a steep flank facing toward the leading end 2c and a less steep or inclined flank, relative to the sleeve axis, facing toward the trailing end of the sleeve. In the region of the sleeve on the opposite side of the teeth 2d, 2e, 2f from the leading end 2c, there is a cross-sectional reduction formed by a circumferentially extending annular groove 2g located in the outside surface of the sleeve. This cross-sectional reduction provides an improved deformation of the expansion sleeve in the direction in which it is inserted into a borehole. Adjacent its trailing end, the expansion sleeve 2 has one or more indentations 2h in its outer surface and the indentations in turn form inwardly directed projections on the inside surface of the sleeve. The projections engage in the thread 1d and secure the expansion sleeve 2 on the anchor bolt 1.

Figure 2:
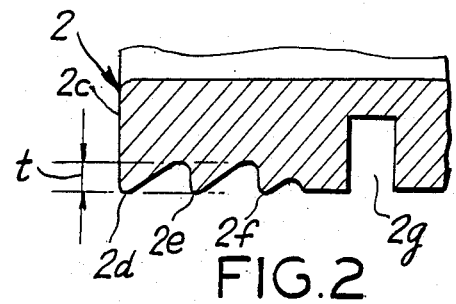
FIG. 2 is a sectional view of a portion of the expansion dowel assembly illustrated in FIG. 1 and shown on an enlarged scale.

As shown in FIG. 2, the radially measured depth t of the necked-down portion or valleys forming the cutting teeth 2d, 2e, 2f decreases in the direction from the leading end toward the trailing end. Such decreasing depth t insures that the intermediate spaces between the cutting teeth 2d, 2e, 2f will be filled by the material removed from the surface of the borehole by the cutting teeth and that a wedging action of the material will develop when a force tending to pull the anchor bolt out of the borehole is applied.

Figure 3:
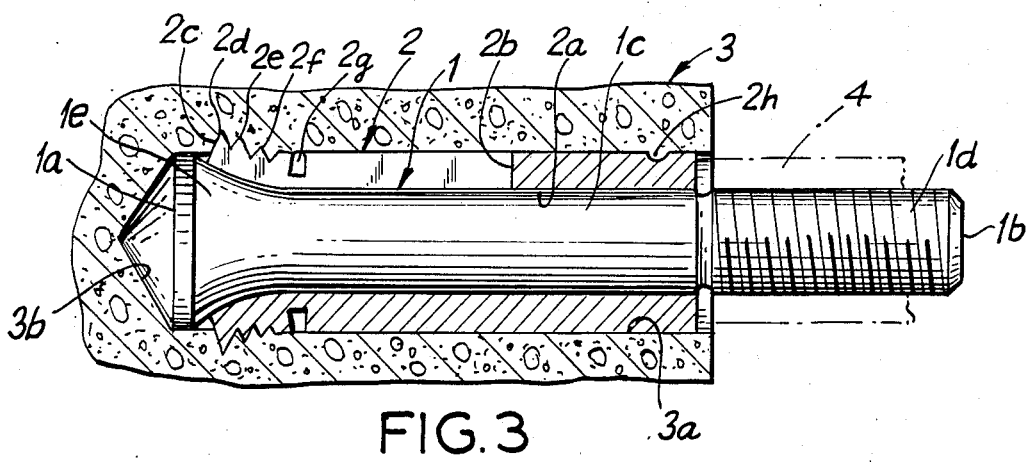
FIG. 3 is an axially extending view, partly in section, similar to FIG. 1, showing the expansion sleeve of the expansion dowel assembly driven relative to the anchor bolt.

In FIG. 3, the expansion dowel assembly is inserted into a borehole 3a in a receiving material 3. When the assembly is inserted, the leading end 1a of the anchor bolt 1 bears against the base 3b of the borehole 3a. Expansion sleeve 2 is driven axially into the borehole and moves over the expansion member 1e on the anchor bolt 1 by means of a tubular placing tool 4 shown in dot-dash lines. When the expansion sleeve 2 is displaced axially relative to the anchor bolt 1, the projections at the inside of the expansion sleeve, formed by the indentations 2h, are sheared off. With the axial movement of the expansion sleeve relative to the expanding member 1e, the cutting teeth 2d, 2e, 2f are forced radially outwardly into engagement with the surface of the borehole 3a and remove a part of the material from the borehole surface. Accordingly, a positive locking connection of the expansion sleeve 2 with the receiving material 3 is effected. The annular groove 2g in the outer surface of the expansion sleeve 2 and the axially extending slots 2b facilitate the radial expansion of the leading end portion of the expansion sleeve 2.

Figure 4:
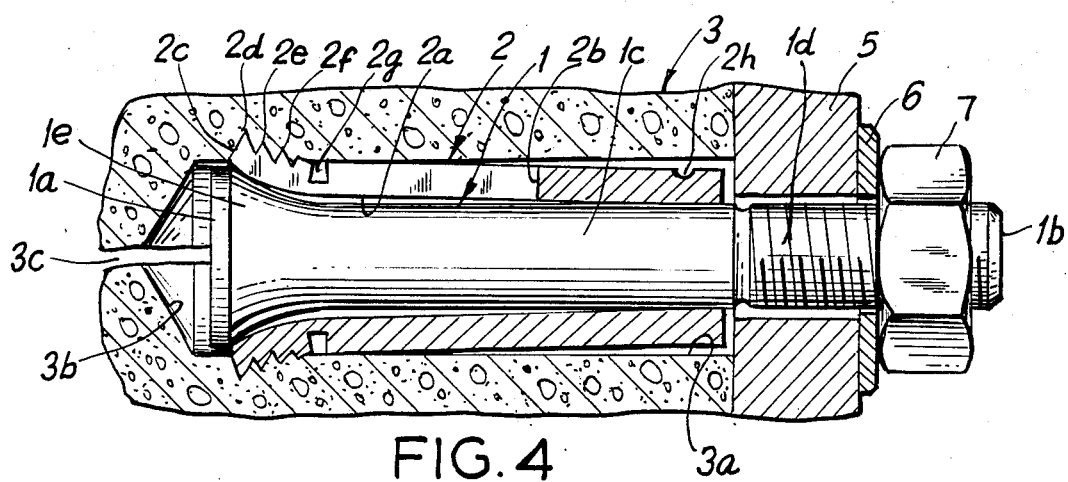
FIG. 4 is an axially extending view, partly in section, displaying the expansion dowel assembly in the finally anchored condition.

In FIG. 4, a structural component part 5 is fastened to the outside surface of the receiving material 3 by placing the part onto the thread 1d of the anchor bolt 1 and securing the part by a washer 6 and a nut 7 screwed onto the thread 1d. At the base 3b of the borehole 3a, a crack 3c in the receiving material 3 is shown. The opening of this crack 3c makes it possible to draw the expansion bolt 1 into the expansion sleeve 2, with the sleeve being anchored in the receiving material 3 in a positive locking manner. The expanding action of the dowel assembly on the crack 3c is slight due to the large conicity of the expanding member 1c at the leading end 1a. After an initial after-expansion of the expansion sleeve, the anchor bolt comes to a stopped position.

While specific embodiments of the invention have been shown and described in detail to illustrate the application of the inventive principles, it will be understood that the invention may be embodied otherwise without departing from such principles.

I claim:

1. Expansion dowel assembly comprising an axially elongated anchor bolt having a leading end and a trailing end spaced apart in the axial direction, an expanding member located at the leading end of said anchor bolt and widening in the direction toward the leading end, an axially elongated shank extending from said expanding member toward the trailing end, means on said shank adjacent the trailing end for attaching a load on said anchor bolt, an axially extending expansion sleeve laterally enclosing said anchor bolt and being axially displaceable relative to said anchor bolt, said expansion sleeve having a leading end closer to the leading end of said anchor bolt and a trailing end closer to the trailing end of said anchor bolt with slots in said expansion sleeve extending from the leading end toward the trailing end, said expansion sleeve having an inside diameter corresponding to and in displaceable relation with the exterior diameter of said shank, said expansion sleeve having an axially extending outer surface with a circumferentially extending first cutting tooth thereon at the leading end thereof, wherein the improvement comprises that said expanding member has a concavely curved axial extending surface, at least one additional cutting tooth on the outer surface adjoining said first cutting tooth and located on the opposite side of said first cutting tooth from the leading end of said sleeve and within the axial extent of said slots, and said cutting teeth form a sawtooth-shaped section facing outwardly from the outer surface of the said expansion sleeve, said expansion sleeve has a cross-sectional reduction therein spaced from and located closely adjacent to and on the opposite side of said cutting teeth from the leading end of said sleeve, said cross-sectional reduction is formed by a circumferentially extending annular groove in the outside surface of said expansion sleeve within the axial extent of said slots.

2. Expansion dowel assembly, as set forth in claim 1, wherein three said cutting teeth are formed in the outer surface of said expansion sleeve adjacent the leading end thereof.

3. Expansion dowel assembly, as set forth in claim 2, wherein each said tooth has a ridge and a valley with the radially measured depth of said valleys inwardly from said ridge decreasing in the direction from the leading end toward the trailing end of said sleeve.

4. Expansion dowel assembly, as set forth in claim 1, wherein said concavely curved surface of said expansion member is formed by a radius.

5. Expansion dowel assembly, as set forth in claim 4, wherein the radius of said concavely curved surface of said expanding member is approximately equal to the largest diameter of said anchor bolt.

* * * * *